C. F. PENN & F. P. RAND.
TRAP POISON RECEPTACLE.
APPLICATION FILED FEB. 26, 1912.

1,047,282.

Patented Dec. 17, 1912.

Witnesses:
F. Griswold
E. P. Schlosser

Inventors
Chas. F. Penn
Frank P. Rand
by Obed C. Billman
Attorney

UNITED STATES PATENT OFFICE.

CHARLES F. PENN AND FRANK P. RAND, OF SPOKANE, WASHINGTON.

TRAP POISON-RECEPTACLE.

1,047,282.  Specification of Letters Patent.  Patented Dec. 17, 1912.

Application filed February 26, 1912. Serial No. 680,094.

*To all whom it may concern:*

Be it known that we, CHARLES F. PENN and FRANK P. RAND, citizens of the United States, residing at Spokane, in the county of Spokane and State of Washington, have invented certain new and useful Improvements in Trap Poison-Receptacles, of which the following is a specification.

Our invention relates to improvements in trap poison receptacles, the primary object being to provide a generally improved combined poison receptacle and trap particularly designed and adapted for use as a safety container or holder for poison in the destruction of flies, ants, and other insects, as well as a trap receptacle adapted to prevent the escape of the insects after partaking of the poison so that the dead insects will be accumulated in the trap receptacle.

A further object of the invention is to provide a convenient container or receptacle for commercial use in storage and transportation, and particularly for handling the poison while in use, whereby the same will be kept out of the reach of children, as well as from domestic animals such as dogs, cats, and the like.

A still further object is to provide an exceedingly simple, cheap, and efficient safety receptacle or container provided with suitable absorbent material adapted to receive and absorb a suitable liquid poison as well as to present a suitable moistened exposed surface and prevent undue evaporation.

A still further object is to provide a suitable commercial combined trap and receptacle having its parts arranged to be readily cleansed or disinfected when desired, and provided with a suitable poison receptacle or container carrying suitable absorbent material which may be readily kept moistened by the addition of water as well as renewed when desired.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
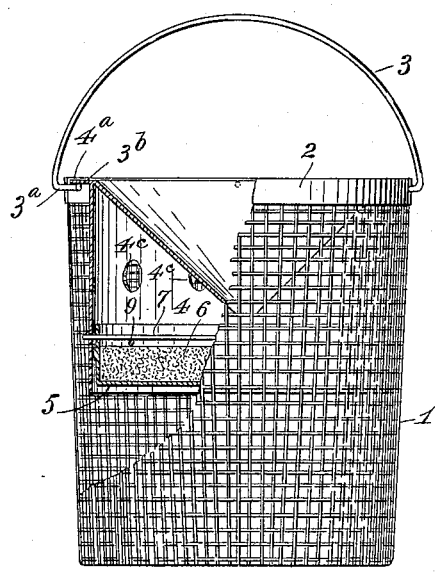
Figure 2:
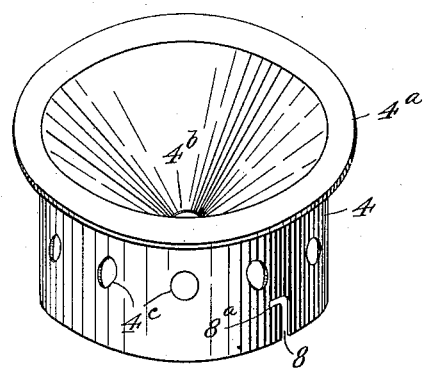
Figure 3:
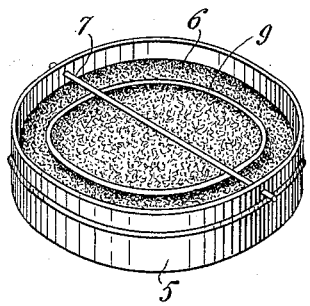
Figure 4:
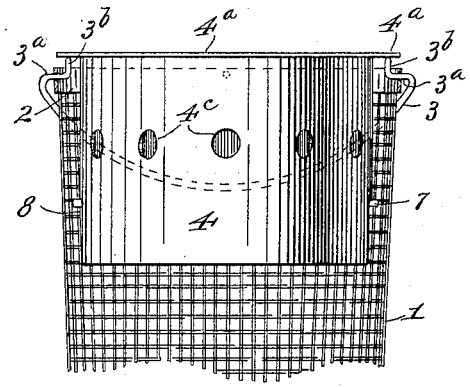
Figure 5:
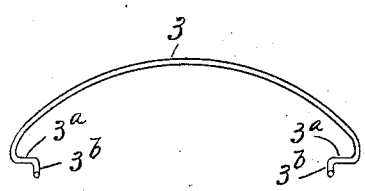

Referring to the drawings, forming a part of this specification, Figure 1, is a side elevation of the improved trap receptacle, partly in section, for the purpose of clearer illustration of the parts. Fig. 2, a perspective view of the trap member removed. Fig. 3, a perspective view of the poison receptacle or container removed from the bottom portion of the trap member. Fig. 4, a vertical sectional view of the main receptacle or bucket member showing the operation of the improved bail member for initially elevating the improved trap member and poison receptacle carried by the latter. Fig. 5, a detailed perspective view of the improved bail member, detached.

Similar numerals of reference designate like parts throughout all the figures of the drawings.

The improved trap receptacle and poison container comprises a main receptacle or bucket member 1, preferably formed of wire or other suitable foraminous material and provided about its upper edges with a metallic rim member 2, provided with a bail member 3, the latter being secured to the metallic rim member 2, by means of pivot or trunnion member 3ª, extending through suitable openings in the rim member and terminating in short lever members 3ᵇ, said lever members projecting within the vertical planes of said metallic rim member and being adapted to extend in a substantially horizontal plane and receive and support the rim portion 4ª, of the removable trap member 4, when the bail member 3, is in a vertical or suspended position as shown in Fig. 1, said lever members 3ᵇ, being adapted to engage beneath and initially elevate the trap member 4, and poison container carried by the latter, when the bail member is depressed, as shown in Fig. 4, of the drawings.

The improved trap member consists of a funnel shaped mouth terminating at its center or depressed apex portion in an opening 4ᵇ, through which the insects may pass in gaining access to the subjacent poison receptacle hereinafter described. The sides of the trap member are spaced from the sides of the main receptacle 1, and are provided with a plurality of openings 4ᶜ, through which the insects may pass after partaking of the poison in the poison receptacle as hereinafter described.

The poison container or receptacle 5, is preferably provided with suitable absorbent material 6, such as felt, cotton wicking, or the like, and is adapted to be removably mounted in the bottom of the trap member in any suitable and convenient manner, as for example,—by means of a cross bar 7, adapted to pass into a pair of vertical slits 8 (see Fig. 2) in the sides of the trap member and to engage in the transverse slits 8ª upon a circumferential movement of the container 5, in an obvious manner.

If desired, the cross bar 7, may be utilized in holding down a ring-shaped holder 9, upon the absorbent material 6, for retaining the latter in proper position or retaining suitable superimposed poison material thereon, such as absorbent fly paper, or the like.

The insects may pass from the trap member 4, into the main receptacle 1, by passing out through the openings 4ᶜ, and the dead insects will be accumulated in the bottom of the main receptacle or bucket 1, and when it is desired to empty the latter of its contents the trap member 4, may be initially elevated as shown in Fig. 4, after which the trap member may be removed and the contents of the main receptacle discharged.

The main receptacle or bucket member 1, is preferably made up of flaring wire sides so that the main receptacle or bucket members may be readily nested together for economizing in space in transportation or storage.

From the foregoing description, taken in connection with the accompanying drawings, the operation and advantages of our invention will be readily understood.

Having thus described one of the embodiments of our invention, what we claim and desire to secure by Letters Patent is,—

1. In a trap poison receptacle, the combination with a bucket receptacle provided with a bail member having lever members projecting therein; of a removable trap member extending into said bucket receptacle and provided with a rim carried by said lever members and adapted to be elevated by the latter when the bail member is depressed.

2. A trap poison receptacle, comprising a foraminous bucket provided with a bail having lever members projecting within the upper marginal edges of said bucket, and a removable poison container and trap member carried by said lever members within said bucket and adapted to be elevated above the latter by the depression of said bail.

In testimony whereof we have affixed our signatures in presence of two witnesses.

CHARLES F. PENN.
FRANK P. RAND.

Witnesses:
WM. LANGBEHN.
E. MYRE.

Copies of this patent may be obtained for five cents each, by addressing the "Commissioner of Patents, Washington, D. C."